No. 806,544. PATENTED DEC. 5, 1905.
A. A. KINNE.
STOVEPIPE.
APPLICATION FILED NOV. 18, 1904.

WITNESSES
INVENTOR
ALFRED A. KINNE
BY Paul & Paul
HIS ATTORNEYS

UNITED STATES PATENT OFFICE.

ALFRED A. KINNE, OF MINNEAPOLIS, MINNESOTA.

STOVEPIPE.

No. 806,544.	Specification of Letters Patent.	Patented Dec. 5, 1905.

Application filed November 18, 1904. Serial No. 233,235.

*To all whom it may concern:*

Be it known that I, ALFRED A. KINNE, of Minneapolis, Hennepin county, Minnesota, have invented certain new and useful Improvements in Stovepipes, of which the following is a specification.

My invention relates to stovepipes, and particularly to the T-joints therefor; and the object of the invention is to provide a joint that is separable to allow a number of them to be nested or placed one within the other for convenience in transporting them from place to place.

A further object is to provide a T-joint that is easily and quickly made up and one that comprises separable parts which can be quickly secured together or separated, as desired.

Other objects of the invention will appear from the following detailed description.

The invention consists generally in various constructions and combinations, all as hereinafter described, and particularly pointed out in the claims.

Figure 1:
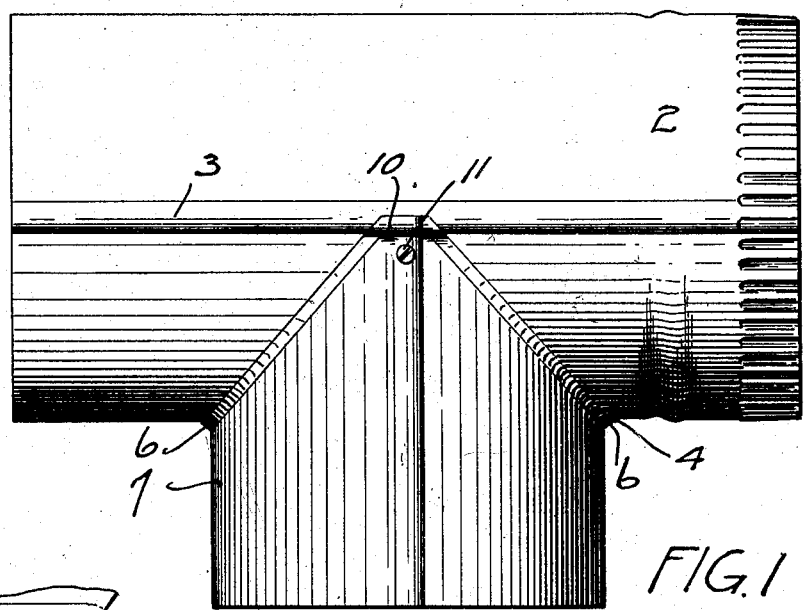
Figure 4:
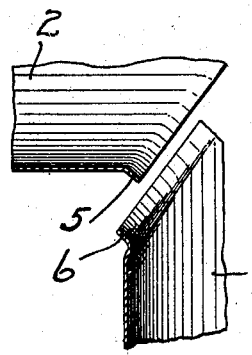
Figures 2, 3:
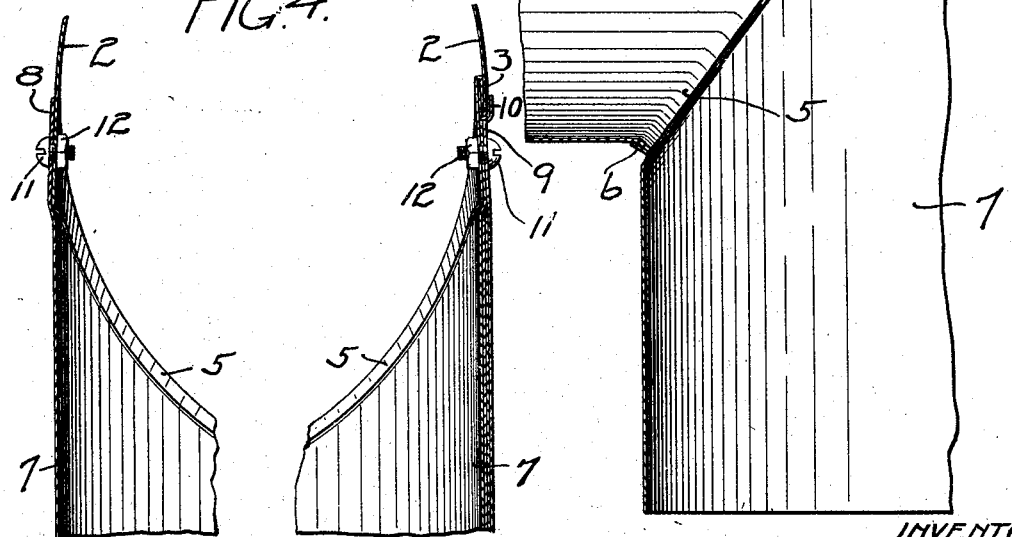

In the accompanying drawings, forming part of this specification, Figure 1 is an elevation of a T-joint embodying my invention. Fig. 2 is a fragmentary sectional view showing the manner of securing the parts of the joint together. Fig. 3 is a view showing flanges or lips provided at the point of intersection of the two members of the joint. Fig. 4 is a detail view illustrating more clearly the position and shape of the lips or flanges on the sections of the joint.

In the drawings, 2 represents a section of pipe cylindrical in form, having one longitudinal edge folded in to receive the oppositely-folded longitudinal edge to form the seam 3. The edges are locked together and the seam is made tight by drawing the folded edges in opposite directions; but when the sections of the joint are separated the pipe may be opened up lengthwise by pressing thereon to separate the edges one from the other at the seam, and when that has been done a number of other similarly-opened pipe-sections may be inserted within the first-named one, forming a nest that will ordinarily accommodate ten or twelve sections and make a compact bundle that can be easily shipped from place to place without danger of its being crushed or broken. Ordinarily great inconvenience and annoyance is experienced by the hardware merchants or manufacturers in shipping stovepipe by rail. It takes a high class, is bulky though comparatively light in weight, and cannot be packed with any degree of economy as regards space in the freight-car or other carrier. This is particularly true of the T-joint, which is of such irregular shape that it is even more difficult than an ordinary straight pipe to pack and ship. By providing a T-joint that is capable of being nested I am able to ship the joints in compact form at a less expense and without danger of their being damaged.

The pipe 2 is provided on one side with an opening 4, and a lip or flange 5 is formed around the edge of said opening and adapted to engage with and make a close-fitting joint with a flaring lip 6 on the other pipe-section 7 of the joint, the end of which is of course hollowed out to fit the curved wall of the pipe 2 and cover the opening therein. This section 7 is provided at the end with tongues 8 and 9, that embrace the pipe-section 2, and the end 9 has a shoulder 10, that bears upon the seam 3 and prevents the folded edges composing said seam from becoming accidentally separated. Stove-bolts 11, having nuts 12, are provided in the ends 8 and 9 of the pipe-section 7 and pass through it and through the wall of the pipe 2 and hold them securely together and draw the lips 5 and 6 up into close contact with one another to insure a tight joint between the pipe-sections. The longitudinal edges of the section 7 are folded in the same manner as described with reference to the pipe 2, and said edges are prevented from separating when the joint is in use by the next section of pipe, that fits within the section 7.

In shipping the T-joint the bolts will be removed and the corresponding sections or parts of a number of joints nested or placed one within the other, thereby insuring a less rate from the transporation company and great economy of space in the car and in a wherehouse or store.

I claim as my invention—

1. A T-joint for stovepipes comprising a pipe-section having folded longitudinal edges adapted to interlock to form a seam, said section having a side hole or opening, a second pipe-section having one end fitting the curved surface of said first-named section and covering said side hole, and said end lapping over said seam and having a shoulder to engage the same and prevent the accidental separation of said folded edges, and bolts securing said sections together.

2. A sheet-metal T-joint comprising a pipe-section having a side hole or opening and folded longitudinal edges adapted to interlock and form a seam, said edges being separable one from the other to permit nesting of a series of sections, a second pipe-section having one end fitting the curved surface of said first-named section and covering said hole, and said second section having interlocking longitudinal edges that are separable one from the other to allow nesting of a series of said second sections, and means for securing the end of said second section to the curved surface of said first-named section, substantially as described.

In witness whereof I have hereunto set my hand this 14th day of November, 1904.

ALFRED A. KINNE.

Witnesses:
RICHARD PAUL,
C. MACNAMARA.